(12) United States Patent
Meyers et al.

(10) Patent No.: US 10,072,491 B2
(45) Date of Patent: Sep. 11, 2018

(54) METHOD AND APPARATUS FOR WELL BORE ILLUMINATION AND INSPECTION

(71) Applicant: ABRADO, INC., Houston, TX (US)

(72) Inventors: Christopher Meyers, Youngsville, LA (US); Marshal Harris, Houston, TX (US); Philip Schultz, Katy, TX (US); Bruce Beacom, Youngsville, LA (US); John C. Wolf, Houston, TX (US)

(73) Assignee: Abrado, Inc., Houston, TX (US)

( * ) Notice: Subject to any disclaimer, the term of this patent is extended or adjusted under 35 U.S.C. 154(b) by 98 days.

(21) Appl. No.: 15/314,388

(22) PCT Filed: Jun. 2, 2015

(86) PCT No.: PCT/US2015/033844
§ 371 (c)(1),
(2) Date: Nov. 28, 2016

(87) PCT Pub. No.: WO2015/187741
PCT Pub. Date: Dec. 10, 2015

(65) Prior Publication Data
US 2017/0101862 A1  Apr. 13, 2017

Related U.S. Application Data

(60) Provisional application No. 62/007,076, filed on Jun. 3, 2014.

(51) Int. Cl.
*H04N 7/18*   (2006.01)
*E21B 47/00*  (2012.01)
*H04N 5/225*  (2006.01)

(52) U.S. Cl.
CPC ....... *E21B 47/0002* (2013.01); *H04N 5/2252* (2013.01); *H04N 5/2254* (2013.01); *H04N 5/2256* (2013.01); *H04N 2005/2255* (2013.01)

(58) Field of Classification Search
CPC .. H04N 5/2256; H04N 5/2254; H04N 5/2252; H04N 2005/2255
USPC ......... 348/85, 84, 73, 64, 135; 386/200, 224
See application file for complete search history.

(56) References Cited

U.S. PATENT DOCUMENTS

| | | | |
|---|---|---|---|
| 2002/0012049 A1* | 1/2002 | Woodstock | H04N 5/2252 348/207.99 |
| 2006/0204781 A1* | 9/2006 | Takei | C04B 28/02 428/688 |
| 2008/0287926 A1* | 11/2008 | Abou El Kheir | A61B 17/3421 606/1 |

* cited by examiner

*Primary Examiner* — Robert Chevalier
(74) *Attorney, Agent, or Firm* — Ted M. Anthony

(57) ABSTRACT

An assembly (100) for the illumination of a wellbore, pipeline, tank, vessel or other environment wherein light is diffused and transmitted through an optically transparent material and projected in and around a field of view of a camera lens (10). A light source is disposed within a cavity at the proximal end (102) of a cylindrical shaped, optically transparent material. Light from the source is received into the transparent material, diffused, and transmitted to the distal end of the light tube (30), where it is projected in front of and around a field of view of a camera. Control of light intensity may be variable, pre-set before operations, or fixed by component design.

17 Claims, 3 Drawing Sheets

METHOD AND APPARATUS FOR WELL BORE ILLUMINATION AND INSPECTION

BACKGROUND OF INVENTION

1. Technical Field of the Invention

The present invention pertains to a method and apparatus for acquiring visual images and/or other data in a wellbore or other environment. More particularly, the present invention pertains to a method and apparatus for acquiring visual images and/or other data in a wellbore or other environment while providing improved illumination of said environment.

2. Brief Description of the Prior Art

Downhole camera systems exist for obtaining video and/or visual images in wellbores, pipelines, tanks, vessels or other similar environments. However, most wellbores or other environments contain little or no existing source of ambient or available light. Accordingly, a light source must be provided to illuminate downhole portions of said environments when acquiring visual data in such areas is desired.

Certain existing camera systems utilize some form of quartz lamp(s) to illuminate downhole portions of a wellbore or other similar environment for purposes of visual data acquisition. In one example, an incandescent light bulb is placed behind a camera body with a reflector. In another example, a low voltage, low power incandescent lamp is used to reduce the power requirements. In yet another example, certain downhole camera systems utilize an array of light-emitting diodes (LEDs) placed around the lens of a camera.

However, placing a light source behind a camera with a reflector causes a large dark section to appear on the acquired visual images; such dark section is caused by the body of the camera being positioned in front of the light source. Such a configuration may be generally acceptable in certain environments (such as, for example, large diameter pipe). However, as the size of a surrounding pipe is reduced, problems with existing light source systems typically increase. Especially in smaller pipe, a camera functions as a light choke, preventing light from entering in the camera's field of view.

Placing light bulbs or LEDs around a camera lens also causes several other problems. Heat from the lamps or LEDs typically causes electronic noise and damages the quality of the images coming from the camera. Camera sensor electronics are also typically rendered inoperable and/or damaged in higher temperature operating environments. Additionally, shining lights directly into fluids or at the top of the object to be viewed can also cause a back-scatter of light resulting in glare or shine spots, further reducing the quality of the images captured.

Thus, conventional lighting designs deployed in downhole camera systems generally fall into two categories: (1) a light source is positioned behind a camera or image sensor; or (2) a circular array comprising a ring light is positioned around a camera or image sensor. With the first option, light projecting from a rearward position tends to cast a distinct shadow on the inspection subject of interest, thereby reducing the quality of captured visual images. With the second option, bulk lamps and LED modules packaged around a camera add to the outside diameter of the imaging instrument, thereby limiting overall effectiveness and versatility, particularly in wells having relatively narrow internal diameters. The type of lighting in the second option is also considered to be 'direct' lighting and causes exponentially more shadows than a diffused lighting system.

In many cases, oil and gas wells and/or other industrial applications involve confined areas with very limited space. Such environments are best served by slim profile equipment that can traverse small tubing sizes and other restrictions. However, housing a high-powered, high-heat dissipating light source within proximity to a temperature-sensitive camera, image sensor and/or associated electronics has represented a long standing design challenge.

Thus, there is a need for a slim-profile camera and illumination assembly that can be beneficially used in wellbores or other environments lacking sources of ambient or available light. The camera and illumination assembly should be robust enough to function in harsh or difficult environments, and should beneficially illuminate a field of view (and a subject of interest therein) in order to improve the quality of captured visual images.

Further, the camera and illumination assembly should permit a high-powered, high-heat dissipating light source to be housed within proximity to the temperature-sensitive camera, image sensor and/or associated electronics, without degrading or negatively impacting performance thereof. Additionally, there is a need for a method of diffusing the light so as to minimize backscatter reflections and improve the quality of captured visual images.

SUMMARY OF THE INVENTION

The present invention comprises a method and apparatus for acquisition and transmission of visual images or other data in wellbores, pipelines, tanks, vessels or other environments. By way of illustration, but not limitation, the present invention comprises a camera system for visual inspection of wellbores, pipelines, tanks, vessels or other environments including, without limitation, oil and/or gas wells. The present invention reduces and/or eliminates problems observed with conventional downhole camera assemblies and, more particularly, lighting systems used to illuminate environments for such cameras.

In a preferred embodiment, the present invention comprises a light source and light tube housed within a common pressure housing as a camera assembly. The light source is disposed within a cavity with polished walls at the proximal end of a 'light tube' such that light is transmitted into optically transparent material of said light tube through the polished surfaces. The 'light tube' acts as a light diffuser as light travels through the tube to prevent direct light and hard shadows.

The camera assembly is disposed within a cavity extending through at least a port of said 'light tube' with a sensor facing the distal end of the assembly. The cavity containing the camera assembly may optionally be enclosed by installing a lens in the distal end of the 'light tube'. A hole and channel for camera wiring can be formed (typically machined) from the camera cavity and along the outside of the 'light tube' in the direction of the proximal end. The lens is shielded from light transmitting through the 'light tube' so as not to incur unwanted shadows. The distal end of the 'light tube' can be beneficially angled or rounded such that light is projected directly in front of and around the camera's field of view.

The present invention can be conveyed into and out of a well on conventional electric line (that is, a line that permits transmission of power and/or data). Alternatively, the present invention can also be equipped with a battery and data-storage means; in such configuration, the present invention can be conveyed in and out of a wellbore via slick line, braided line or continuous (coiled) tubing. With such embodiments, the present invention can be conveyed through an area of interest via mechanical means using battery power and with image data stored within internal memory. Such data can be downloaded and processed following retrieval of the present invention from the well.

The benefits of the present invention include, without limitation, providing light through a light tube to a viewing area while eliminating hot or white spots. The present invention also reduces glare and reflection caused by pointing LED's or other light source(s) directly toward an object to be viewed. Unlike existing back-lighted cameras, the present invention permits light to emanate directly into an entire field of view, and no dark spot or section is caused by a camera body. The illuminated camera system of the present invention is beneficially slim, and capable of working in a full range of pipe sizes or other confined environments.

BRIEF DESCRIPTION OF THE DRAWINGS

The foregoing summary, as well as any detailed description of the preferred embodiment, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

BEST MODE FOR CARRYING OUT THE INVENTION

The application on which this application claims priority, U.S. Provisional Patent Application No. 62/007,076, filed Jun. 3, 2014, is incorporated herein by reference.

The present invention comprises a method and apparatus for acquisition and transmission of visual (still and/or video) images, or other data or information, in a downhole or other environment. By way of illustration, but not limitation, the present invention comprises a camera system for downhole visual inspection of wellbores including, without limitation, oil and/or gas wells. The method and apparatus of the present invention reduce and/or eliminate problems observed with conventional downhole camera assemblies and, more particularly, lighting systems used to illuminate environments for capturing visual images by such cameras.

Figure 1:
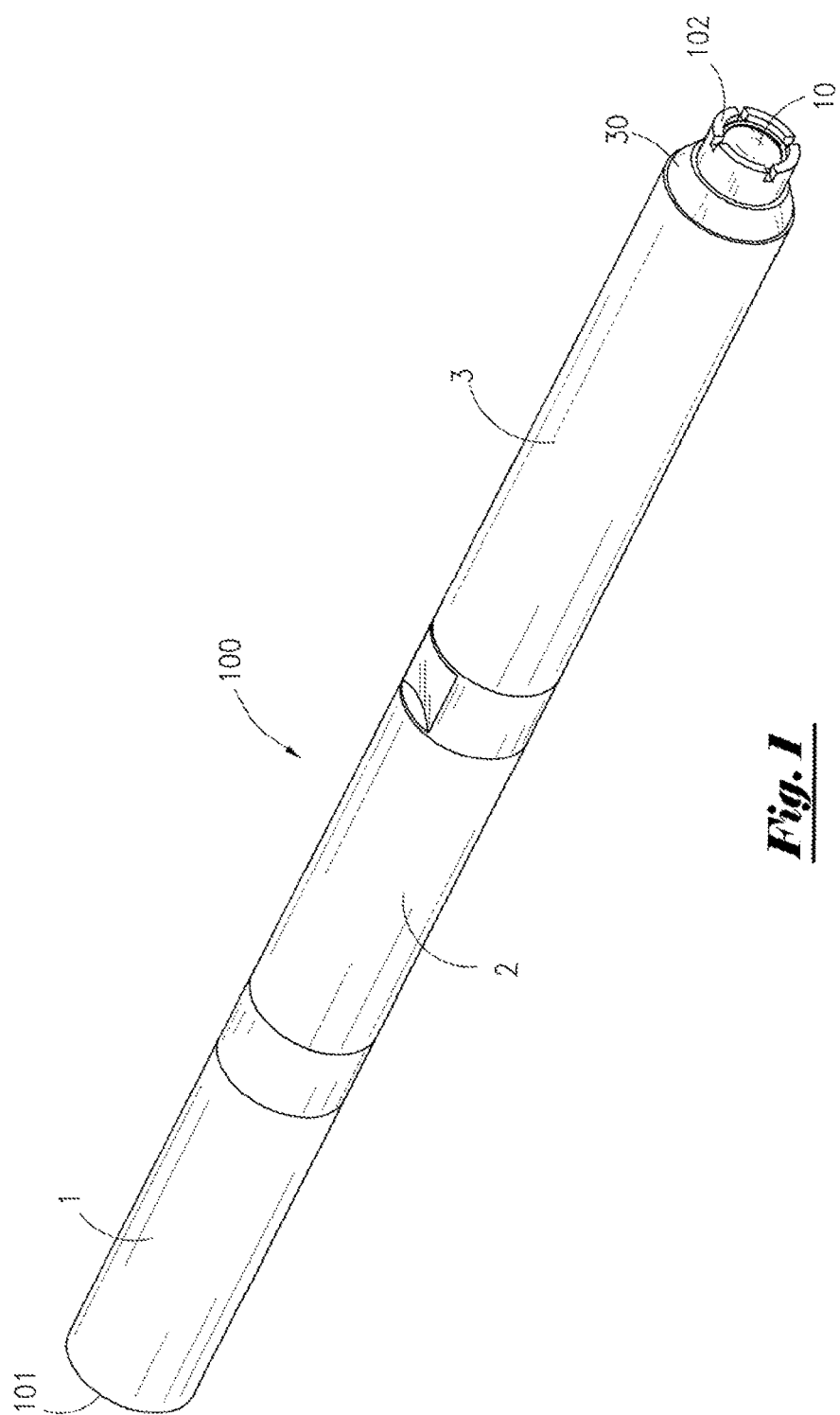
FIG. 1 depicts a side perspective view of the camera and illumination assembly of the present invention.

FIG. 1 depicts a side perspective view of a first embodiment of an illuminated camera and illumination assembly 100 of the present invention. Although additional embodiments can be envisioned, in the embodiment depicted in the appended drawings said camera and illumination assembly 100 of the present invention is adapted to be conveyed into and out of a well bore via conventional spooled electric line permitting real time power and data transmission in and out of said well. Alternatively, it is to be observed that said camera and illumination assembly 100 can also be equipped with a battery and data-storage means without departing from the scope of the present invention; in such a configuration, the present invention can be conveyed in and out of a wellbore via slick line, braided line, continuous (coiled) tubing or other means that do not permit the real time transmission of power or data.

Camera and illumination assembly 100 embodies a substantially elongated cylindrical shape having proximate end 101 and distal end 102. Still referring to FIG. 1, a camera is disposed within camera housing 3. A portion of light tube 30 extends from camera housing 3, while camera lens 10 is disposed at distal end 102.

In the embodiment depicted in FIG. 1, camera assembly 100 comprises upper housing 1, central housing 2 and camera housing 3, which are operationally joined as more fully described below. In a typical operational arrangement, distal end 102 is oriented in a "downhole" or leading-end configuration within a well, while proximate end 101 is positioned on the "uphole" portion of the assembly. Proximate end 101 can connect to the distal end of a wireline or tubing string used to convey camera and illumination assembly 100 in and out of a wellbore.

Figure 2:
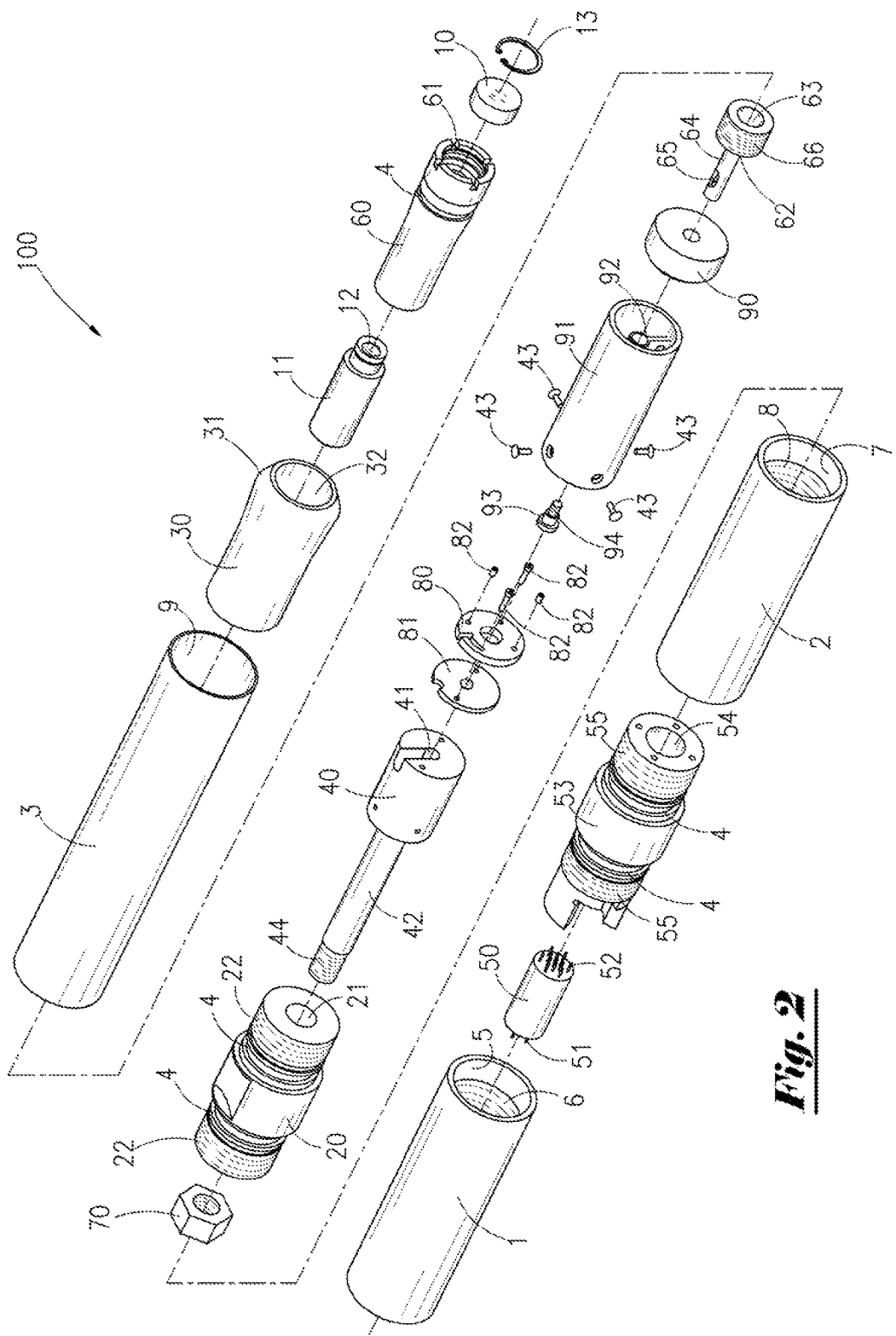
FIG. 2 depicts an exploded perspective view of the camera and illumination assembly of the present invention.

FIG. 2 depicts an exploded perspective view of camera and illumination assembly 100 of the present invention. Electrical pin contact member 50 having upper pins 51 and lower pins 52 is disposed within a central bore 54 of intermodule 53. Upper housing 1 has central bore 5 and inner threads 6. Upper external threads 55 of intermodule 53 connect to inner threads 6, thereby providing for operational attachment of said intermodule 53 to upper housing 1, while seal member(s) 4 (which can be a rubber o-ring or thermoplastic material having desired sealing properties) can provide a fluid pressure seal. Pins 51 and 52 are beneficially provided to allow for the transmission of power and/or data through the assembly of the present invention in order to power and/or control various electronic components of camera and illumination assembly 100.

Central housing member 2 has central bore 7 and inner threads 8. Lower external threads 55 of intermodule 53 connect to inner threads 8 of central housing member 2, thereby providing for operational attachment of said intermodule 53 to central housing 2, while seal member(s) 4 (which can be a rubber o-ring or thermoplastic material having desired sealing properties) can provide a fluid pressure seal between said components.

Light head adapter 20 has central bore 21 and upper and lower external threads 22. Upper external threads 22 of light head adapter 20 connect to inner threads 8 of central housing member 2, thereby providing for operational attachment of said light head adapter 20 to central housing 2, while seal member(s) 4 can provide a fluid pressure seal between said components.

Heat sink member 40 has central through bore 41, extended neck section 42 and external threads at the upper end of said extended neck section 42. When assembled, said extended neck section 42 is received within central through bore 21 of light head member 20. Lock nut 70, which has a larger outer diameter than the inner diameter of bore 21 of light head adapter 20, is threaded on external threads 44 of heat sink insert 40, thereby operationally attaching said heat sink member 40 to light head adapter 20.

Planar mounting spacer 80 and light source 81 are attached to the base of heat sink member 40 using fasteners 82. Although other light sources can be envisioned without departing from the scope of the present invention, in the preferred embodiment said light source comprises at least one light emitting diode ("LED") assembly. Adapter member 91 having central bore 92 is received over light source 81 and secured to heat sink member 40 using a plurality of threaded screws 43. Optical back up ring 90 having a central bore is positioned against the lower end of adapter member 91.

Pressure barrel retainer member 62 has central through bore 63, extended neck section 64, external threads 66 at the base of said pressure barrel retainer member 62, and side aperture 65 extending through said extended neck section 64 to central through bore 63. When assembled, said extended neck section 64 is received within central through bore 92 of adapter member 91. Shoulder screw 93 is threaded into threads on the inner surface of extended neck section 64, thereby operationally attaching pressure barrel retainer member 62 and optical back up ring 90 to adapter member 91.

Pressure barrel 60 has central through bore 61. Camera 11 having input sensor 13 is disposed within said through bore 61 of pressure barrel 60. Lens 10 is disposed within said bore 61 in proximity to input sensor 12 and is secured in place using snap ring 13. Pressure barrel 60 (together with camera 11) is received within central bore 32 of light tube 30, while threads on the inner surface of bore 61 of pressure barrel 60 are mated with external threads 66 on the outer surface of pressure barrel retainer 62. In this manner, pressure barrel 60 (together with light tube 30 and camera 11) is operationally attached to pressure barrel retainer 62.

Pressure barrel 60, light tube 30 and camera 11 are received within inner bore 9 of camera housing 3. Upper internal threads in bore 9 of camera housing 3 mate with lower external threads 22 of light head adapter 20, thereby providing for operational attachment of said light head adapter 20 to camera housing 3, while seal member(s) 4, as well as the cooperating tapered surfaces, can provide a fluid pressure seal between said components.

Figure 3A:
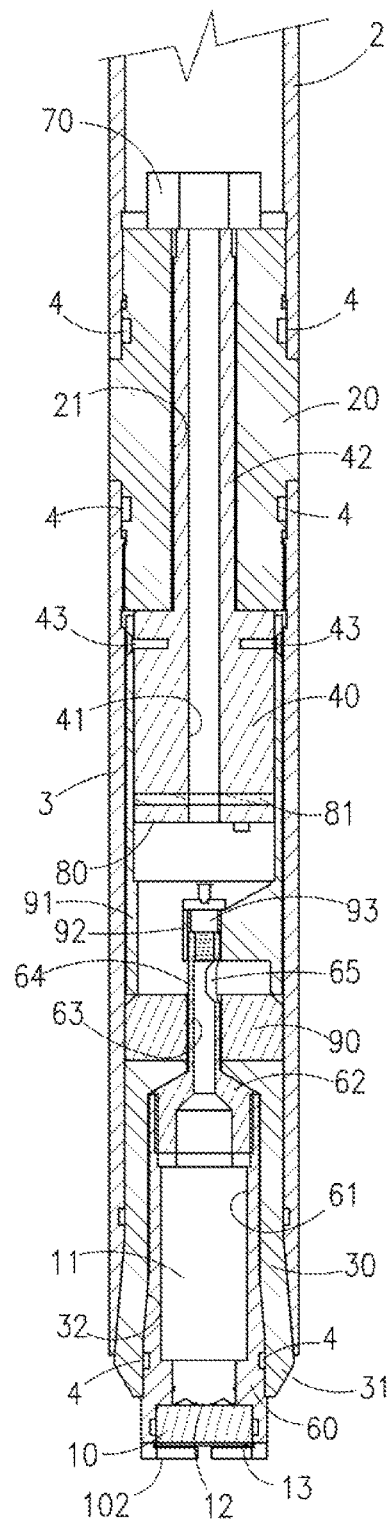
FIG. 3A depicts a side sectional view of a portion of the camera and illumination assembly of the present invention.
Figure 3B:
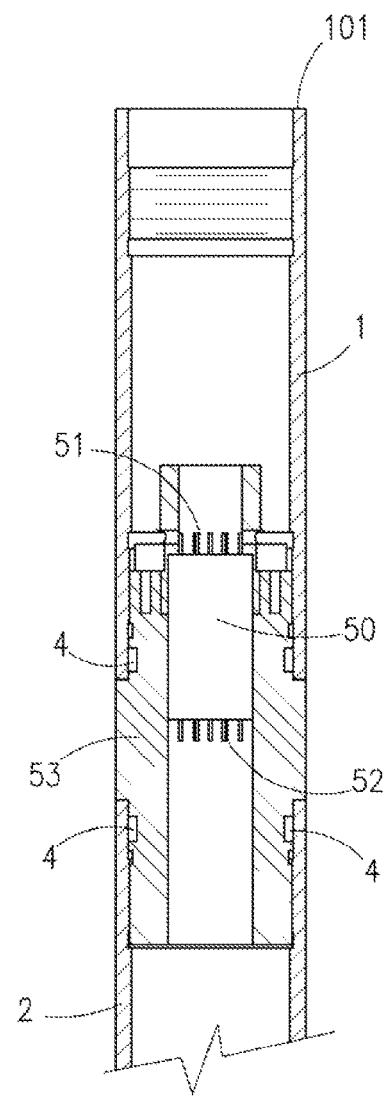
FIG. 3B depicts a side sectional view of a portion of the camera and illumination assembly of the present invention.

FIG. 3A depicts a side sectional view of a lower portion of camera and illumination assembly 100 of the present invention, while FIG. 3B depicts a side sectional view of an upper portion of said camera and illumination assembly 101. As depicted in FIG. 3B, electrical pin contact member 50 having upper pins 51 and lower pins 52 is disposed within a central bore 54 of intermodule 53. Said intermodule 53 connects to upper housing 1, while seal member(s) 4 can provide a fluid pressure seal. Central housing member 2 is likewise connected to intermodule 53, while seal member(s) 4 can provide a fluid pressure seal between said components.

Referring to FIG. 3A, light head adapter 20 is connected to central housing member 2 and camera housing 3. Seal member(s) 4 can provide fluid pressure seals between said light head adapter 20 and each of said housing members.

As discussed above, heat sink member 40 has central through bore 41, extended neck section 42 and external threads at the upper end of said extended neck section 42. Extended neck section 42 is received within central through bore 21 of light head adapter 20, while lock nut 70 mates with said external threads 44 of heat sink insert 40, thereby operationally attaching said heat sink member 40. Planar mounting spacer 80 and LED light source 81 are attached to the base of heat sink member 40 using fasteners 82.

Adapter member 91 having central bore 92 is received over light source 81 and secured to heat sink member 40, while optical back up ring 90 is positioned against the lower end of adapter member 91. Pressure barrel retainer member 62 has central through bore 63, extended neck section 64 and side aperture 65 extending through said extended neck section 64 to central through bore 63. Said extended neck section 64 is received within central through bore 92 of adapter member 91, while shoulder screw 93 is connected to extended neck section 64, thereby operationally attaching pressure barrel retainer member 62 and optical back up ring 90 to adapter member 91.

Camera 11 having input sensor 12 is disposed within through bore 61 of pressure barrel 60, while lens 10 is secured in place using snap ring 13. Pressure barrel 60 (together with camera 11) is received within central bore 32 of light tube 30, and mated with pressure barrel retainer 62. Thus, pressure barrel 60 (together with light tube 30 and camera 11) is operationally attached to pressure barrel retainer 62. Shoulder screw 93 prevents axial movement of pressure barrel retainer 62 (and operationally attached components) in the direction of distal end 102 of camera and illumination assembly 100, but does permit limited axial movement in the opposite direction in the event that the fluid pressure within portion(s) of camera and illumination assembly 100 exceed the pressure of the surrounding environment.

As depicted in FIG. 3A, the distal end surface 31 of light tube 30 has a curved or beveled surface. In a preferred embodiment, said end surface 31 embodies a substantially convex shape or curvature. Further, a portion of said leading edge 31 extends out of the distal end of inner bore 9 of camera housing 3, such that any light transferred through light tube 30 is projected out of said light tube by end surface 31 into the surrounding environment and is not blocked by camera housing 3.

Still referring to FIGS. 3A and 3B, it is to be observed that a continuous path through camera and illumination assembly 100 is provided for wiring associated with camera 10 and LED light source 80 to reach electrical connector 50. Said electrical connector 50, in turn, can be connected to the distal end of a length of electric line in a manner well known to those having skill in the art of electric line operations. Alternatively, said electrical connector 50 can be connected to a battery and conveyed via slickline or other non-conductive means.

Camera 11 is adapted to capture visual still or video images or other desired optical data. Said camera 11 is beneficially centralized within light tube 30, while high pressure camera lens 10 cooperates with pressure barrel 60 to isolate and protect camera 11 from elevated wellbore pressures.

Light generated by light source 81 is transferred or conveyed via light tube 30 into a surrounding environment (such as a wellbore or the like) and diffused into said surrounding environment. Such light is beneficially directed substantially downward and diffused such that the entire area (for example, a section of pipe) within a viewing area of camera 11 is illuminated. In this manner, light can be beneficially emitted around and out past the camera lens 10 and into the field of view of camera 11.

The benefits of the present invention include, without limitation, providing light through light tube 30 to a viewing area while eliminating hot or white spots. Camera and illumination assembly 100 of the present invention also reduces glare and reflection caused by pointing LED's or other light sources directly toward a target or object to be viewed. Unlike existing back-lighted cameras, the light is emanating directly into the entire field of view, and no dark spot or section is caused by the camera body. Camera and illumination assembly 100 of the present invention is capable of working in a full range of pipe sizes, including wells having small internal diameter pipe.

Heat sink insert 40 beneficially comprises material(s) capable of absorbing and dissipating heat. Said heat sink insert 40 can beneficially draw any heat from control electronics (which may be positioned in the vicinity of electrical connector 50) or other sources away from camera 11 and provide a thermal barrier, isolating such heat from camera 11.

By isolating heat generated by supporting electronics, as well as the surrounding environment, from said camera 11, a smaller diameter camera assembly can be used. This permits camera and illumination assembly 100 to be used in smaller and hotter wellbores than conventional camera assemblies, while yielding better quality visual images.

Light is conveyed via light tube 30 without divergent back-reflection and concentration to permit greater intensity. Thus, camera and illumination assembly 100 of the present invention permits a high-powered, high-heat dissipating light source to be housed within proximity to (such as in the same tubular housing with) a temperature-sensitive camera, image sensor and/or associated electronics, without negatively affecting or degrading performance thereof.

Light tube 30 can be constructed of a polycarbonate material that exhibits greater ability to transfer and diffuse light in accordance with the present invention. However, despite such beneficial properties, such polycarbonate material can have a tendency to flow at elevated temperatures and/or pressures, which are frequently observed downhole in wellbores or other harsh environments where the camera and illumination assembly 100 of the present invention may be employed. As such, optical back up ring 90 can be constructed of sapphire or other material that permits the transfer of light, but serves as a physical barrier to prevent the flow or expansion of light tube 30 into the inner portion of camera and illumination assembly 100 at such elevated environmental temperatures and/or pressures.

Further, in a preferred embodiment, the walls of light tube 30 have a greater thickness at their distal end in the vicinity of end 31, than at the opposite proximate end. Light tube 30 has a corresponding greater outer diameter at its distal end than its proximate end; the outer surface of said light tube 30 embodies an outward flare near said distal end. Similarly, pressure barrel 60 is also tapered and has a larger wall thickness and diameter at its lower distal end than its upper proximate end. Camera housing 3 has a smaller wall thickness (and, thus, a larger inner diameter) at its lower distal end than its upper proximate end.

The tapered geometry of light tube 30, pressure barrel 60 and camera housing allows said components to cooperate for more even pressure distribution across said light tube 30. As noted above, camera housing 3 and camera pressure barrel 60 are also tapered to cooperate with tapered shape of light tube 30 to increase load bearing surface area. All of the tapers for 60, 30 and 3 work together so that the bearing stress is mainly focused on the outer pressure housing 3.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention. Of particular note, said invention can be used in any environment with insubstantial light for viewing including but not limited to pipelines and surface equipment.

The invention claimed is:

1. An apparatus for acquiring visual images in a well or other confined environment comprising:
   (a) a light source;
   (b) a tube adapted to transmit light having a first end, a second end and a central bore;
   (c) a camera having a field of view, wherein said camera is disposed in said central bore of said tube and said field of view is oriented toward said second end of said tube; and
   (d) an optical barrier member disposed between said tube and said light source, wherein said optical barrier member is adapted to transmit light without deforming in response to increase in temperature or pressure.

2. The apparatus of claim 1, further comprising a heat sink.

3. The apparatus of claim 1, wherein said optical barrier member is at least partially constructed of sapphire.

4. The apparatus of claim 1, wherein said light tube has a curved surface at said second end.

5. The apparatus of claim 4, wherein said curved surface has a substantially convex shape.

6. The apparatus of claim 1, wherein said light tube has a substantially flat surface at said distal end.

7. The apparatus of claim 1, wherein said light source comprises at least one light emitting diode.

8. The apparatus of claim 1, wherein said camera is disposed within a fluid pressure sealed housing.

9. An apparatus for acquiring visual images in a well or other confined environment comprising:
   (a) a housing having a proximate end, a distal end and an inner space between said proximate and said distal end;
   (b) a light source disposed within said inner space of said housing;
   (c) a tube at least partially constructed of polycarbonate material adapted to transmit light having a first end, a second end and a central bore, wherein said first end is disposed in said inner space of said housing, and said second end extends out of the distal end of said housing;
   (d) a camera having a field of view, wherein said camera is disposed in said central bore of said tube and said field of view is oriented toward said second end of said tube; and
   (e) an optical barrier member disposed within said inner space of said housing between said tube and said light source, wherein said optical barrier member is adapted to transmit light without deforming in response to increase in temperature or pressure.

10. The apparatus of claim 9, further comprising a heat sink.

11. The apparatus of claim 9, wherein said optical barrier member is at least partially constructed of sapphire.

12. The apparatus of claim 9, wherein said light tube has a curved surface at said second end.

13. The apparatus of claim 12, wherein said curved surface has a substantially convex shape.

14. The apparatus of claim 9, wherein said light source comprises at least one light emitting diode.

15. The apparatus of claim 9, wherein said camera is disposed within a fluid pressure sealed housing.

16. The apparatus of claim 9, wherein said light tube and pressure sealed housing are tapered, and said light tube and pressure sealed housing each have a greater outer diameter at their distal end than their proximate end.

17. The apparatus of claim 16, wherein said housing is tapered, having a smaller inner diameter at its distal end than its proximate end.

* * * * *